Inventors:
Milton E. Long,
George W. Katzung,
by
Their Attorney.

UNITED STATES PATENT OFFICE.

MILTON E. LONG AND GEORGE W. KATZUNG, OF PITTSFIELD, MASSACHUSETTS, ASSIGNORS TO GENERAL ELECTRIC COMPANY, A CORPORATION OF NEW YORK.

ELECTRIC HEATING DEVICE.

1,376,023.  Specification of Letters Patent.  Patented Apr. 26, 1921.

Application filed April 2, 1917. Serial No. 159,064.

*To all whom it may concern:*

Be it known that we, MILTON E. LONG and GEORGE W. KATZUNG, citizens of the United States, residing at Pittsfield, in the county of Berkshire, State of Massachusetts, have invented certain new and useful Improvements in Electric Heating Devices, of which the following is a specification.

Our invention relates to a heating device, and while the same is particularly applicable to a toaster, it will be understood that the same is useful in connection with other devices.

More especially our invention relates to a toaster provided with means for automatically turning the toast to bring the side of the toast remote from the heating device adjacent thereto.

Figure 1:
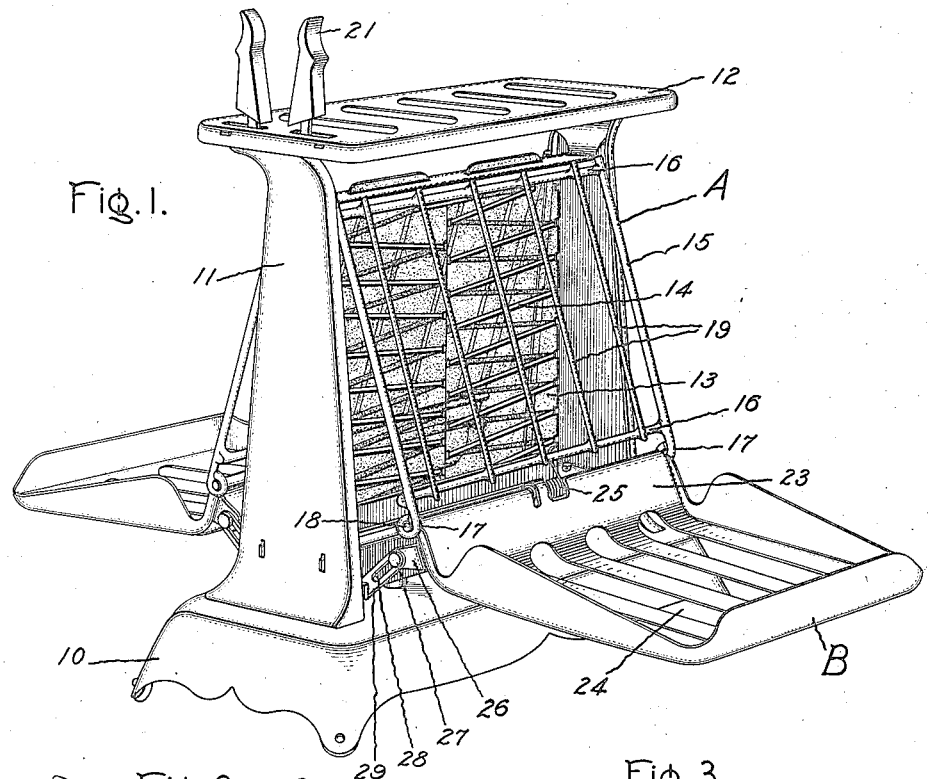
Figure 2:
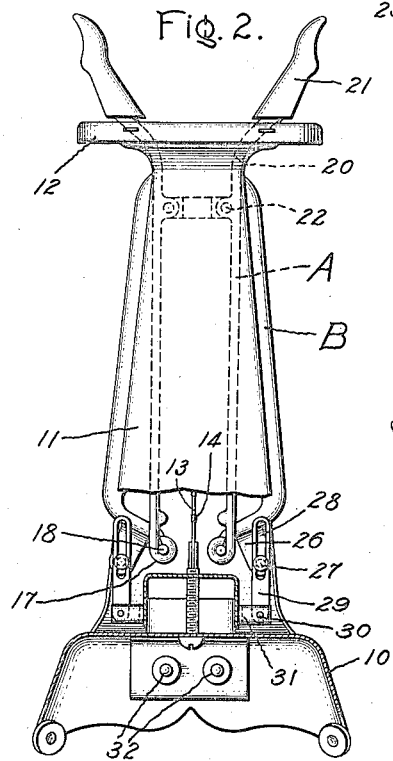
Figure 3:
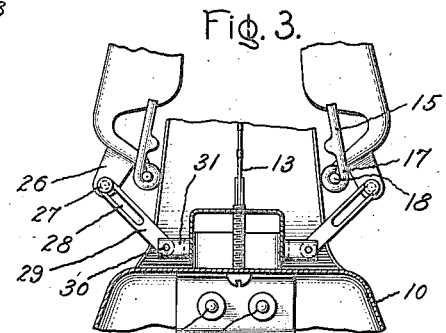
Figure 4:
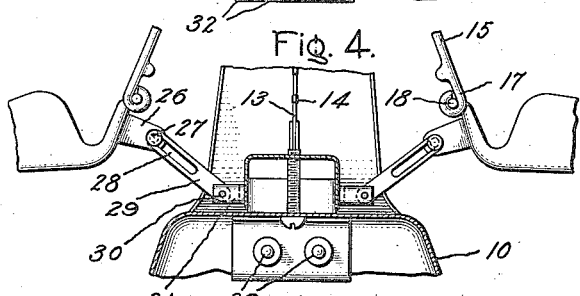

Our invention will best be understood by reference to the accompanying drawings, which show one embodiment of the invention, and in which: Figure 1 is a perspective view of a toaster embodying our invention; Fig. 2 is an end elevation thereof; Fig. 3 is a detailed view showing the bottom of the bread baskets swung outwardly, and the positions of the parts associated therewith; and Fig. 4 is a view similar to Fig. 3 but showing the outer sections of the baskets swung outwardly and downwardly.

Referring now to the drawings, 10 is the base of a heating device which we have here shown as a toaster, provided with end standards 11 on the top of which is supported the usual top plate 12. We have here illustrated the heating unit as electrical and comprising a supporting base 13 of mica or other insulating material, on which a suitable resistance unit 14 is wound in a manner well understood in the art.

For convenience of description, we shall describe the construction and operation of a single device for turning the toast, it being understood that two devices are used, one on either side of the heating device which are identical in construction and operation. The basket for the bread comprises two sections, A and B, the section A comprising a frame formed with longitudinal bars 15 and cross bars 16 suitably secured together. The bars 15 are provided at their lower ends with extensions 17 which are formed into loops which receive the ends of a bar 18 secured to the inner end of the section B thus forming a pivotal connection between the two sections at their lower ends. The inner section A of the basket is preferably provided with longitudinal bars 19 which form a suitable grid support for the bread. One of the bars 15 is provided at its upper end with an extension 20 provided at its end with an operating handle 21, the bar and the entire basket being pivoted at 22. The outer section of the basket is formed with an incline 23 at the portion adjacent the inner section, and is preferably provided with slots 24 through which the toasting of the bread can be observed. A coiled spring 25 surrounds the bar 18, one end of the spring engaging the lower cross bar 16 while the other end engages the outer section B, the spring being fastened in such a way as to move the outer section upwardly to the position shown in Fig. 2. The lower end of the section B is provided with a lug 26 which carries a pin 27 engaging a slot 28 in a link 29 which is pivoted at 30 to a lug 31 on the base plate.

The terminals for the electric heating unit are indicated underneath the toaster at 32.

The operation of our device which will be readily understood from the foregoing description, is as follows: Assuming that the parts are in the position shown in Fig. 2, with each basket supplied with a piece of toast. Now, if it is desired to turn the toast, the operator presses together the thumb pieces 21. This throws outwardly the bottoms of the baskets, which are normally held adjacent the single heating element, by gravity, until the pins 27 on the lugs 26 reach the ends of the slots 28. Continued pressure of the thumb pieces 21 then causes the outer sections B to move about the bars 27 as pivots. It will be seen from Fig. 3 that the pivotal connections at 18 between the inner and outer sections of the basket are, at this time located above the pins 27 so that when force is applied outwardly against the pivotal points 18, it causes the outer sections B to swing about their pivots as indicated. When the outer section B has been swung to the position shown in Fig. 1, the toast slides down from the inner section onto the section B, bringing the toasted side underneath so that when the pressure is released on the thumb pieces and the spring 25 returns the section B to its normal position, the toast is reversed and the untoasted side is brought adjacent to the heating element.

The operator can readily turn the toast in only one of the baskets, when desired, by applying sufficient transverse force to operate the same, and applying pressure to the other otherwise than in a transverse direction.

It will be apparent that the condition of the toast may be observed by simply pulling out the top of the outer section when the toast will face outwardly, and the operator can thus readily determine when the same is properly toasted and ready to be reversed.

In accordance with our invention, it will be apparent that we are enabled to use a single heating element in the manner usual with electric toasters, and that the toast, during the normal toasting operation, is brought adjacent thereto in the usual manner.

In accordance with the provisions of the patent statutes, we have described the principle of operation of our invention, together with the apparatus which we now consider to represent the best embodiment thereof; but we desire to have it understood that the apparatus shown is only illustrative and that the invention can be carried out by other means.

What we claim as new and desire to secure by Letters Patent of the United States is:—

1. In a heating device, the combination of a heating element, a swinging basket having two sections which inclose and support the article to be treated adjacent to the heating element and means for swinging the inner section of the basket to an inclined position so that the articles will slide downward and for swinging the outer section downwardly from the inner section to a substantially horizontal position to receive the article as it slides downward.

2. In a heating device, the combination of a heating element, and means for supporting the article to be treated adjacent to the heating element, comprising a basket movable outwardly at the bottom and comprising opening sections for reversing the position of the article relatively to the heating element.

3. In a heating device, the combination of a heating element, a swinging basket comprising two members for inclosing the article to be treated and holding the same adjacent the heating element, and means for swinging the bottom of the basket away from the heating element and then swinging the outer section of the basket downwardly away from the other section.

4. In a heating device, the combination of a heating element, a swinging basket comprising two members for inclosing the article to be treated and holding the same adjacent the heating element, means for swinging the bottom of the basket away from the heating element and then swinging the outer section of the basket downwardly away from the other section, and means for returning said outer member to its original position.

5. In a heating device, the combination of a heating element, a pivoted basket held by gravity adjacent the heating element, the basket comprising two members for holding the article to be treated, and means for swinging the bottom of the basket away from the heating element and then swinging the outer section of the basket downwardly away from the other section.

6. In a heating device, the combination of a substantially vertical heating element, a pivoted basket for holding the article to be heated and held by gravity adjacent the heating element, and means for swinging the bottom of the basket outwardly and then swinging the outer section downwardly and returning the sections whereby the article is reversed in its position relative to the heating element.

7. In a heating device, the combination of a heating element, a swinging basket comprising two members for inclosing the article to be treated and holding the same adjacent the heating element, manually operated means for swinging the bottom of the basket away from the heating element and then swinging the outer section of the basket away from the other section, and means for automatically closing the basket.

8. In a heating device, the combination of a heating element, a swinging basket comprising two members for inclosing the article to be treated and holding the same adjacent the heating element, and means for reversing the position of the article in the basket comprising a link pivoted to the base and provided with a slot engaging a member secured to the basket.

In witness whereof, we have hereunto set our hands this 30th day of March, 1917.

MILTON E. LONG.
GEORGE W. KATZUNG.